US008007912B2

(12) United States Patent
Kuntz et al.

(10) Patent No.: US 8,007,912 B2
(45) Date of Patent: Aug. 30, 2011

(54) FUSER MEMBER WITH INTERMEDIATE ADHESIVE LAYER

(75) Inventors: Alan Richard Kuntz, Webster, NY (US); Joy Longhenry, Webster, NY (US); Kevin Taft, Williamston, NY (US)

(73) Assignee: Xerox Corporation, Norwalk, CT (US)

( * ) Notice: Subject to any disclaimer, the term of this patent is extended or adjusted under 35 U.S.C. 154(b) by 791 days.

(21) Appl. No.: 11/941,303

(22) Filed: Nov. 16, 2007

(65) Prior Publication Data

US 2009/0130462 A1 May 21, 2009

(51) Int. Cl.
*B32B 25/04* (2006.01)
*B32B 25/14* (2006.01)
*B32B 25/20* (2006.01)
*G03G 15/20* (2006.01)

(52) U.S. Cl. ......... 428/421; 428/447; 428/448; 399/333

(58) Field of Classification Search ........................ None
See application file for complete search history.

(56) References Cited

U.S. PATENT DOCUMENTS

| | | | | |
|---|---|---|---|---|
| 4,257,699 | A | 3/1981 | Lentz | |
| 4,373,239 | A | 2/1983 | Henry | |
| 5,017,432 | A | 5/1991 | Eddy | |
| 5,049,444 | A | 9/1991 | Bingham | |
| 5,061,965 | A | 10/1991 | Ferguson | |
| 5,217,837 | A | 6/1993 | Henry | |
| 5,332,641 | A | 7/1994 | Finn | |
| 5,501,881 | A | 3/1996 | Fuller | |
| 5,512,409 | A | 4/1996 | Henry | |
| 5,534,347 | A | 7/1996 | Chen | |
| 5,695,878 | A | 12/1997 | Badesha | |
| 5,700,568 | A | 12/1997 | Badesha | |
| 5,729,813 | A | 3/1998 | Eddy | |
| 5,750,204 | A | 5/1998 | Badesha | |
| 5,753,307 | A | 5/1998 | Badesha | |
| 5,861,460 | A | 1/1999 | Hamada | |
| 6,146,751 | A | 11/2000 | Chen | |
| 6,479,158 | B1 * | 11/2002 | Kuntz et al. | 428/447 |
| 6,555,181 | B1 | 4/2003 | Santos | |
| 2004/0253436 | A1 * | 12/2004 | Heeks et al. | 428/447 |
| 2007/0054077 | A1 * | 3/2007 | Barrese et al. | 428/35.7 |

* cited by examiner

*Primary Examiner* — Ramsey Zacharia
(74) *Attorney, Agent, or Firm* — Fay Sharpe LLP

(57) ABSTRACT

In accordance with the disclosure, a fusing member is provided comprising, in order, a base member, a cured liquid silicone rubber substrate layer, an amino silane, and an anhydrous solvent containing adhesive layer. The fusing member further comprises a fluoroelastomer fusing surface topcoat layer including poly (vinylidene fluoride-tetrafluoroethylene-hexafluoropropylene).

4 Claims, 1 Drawing Sheet

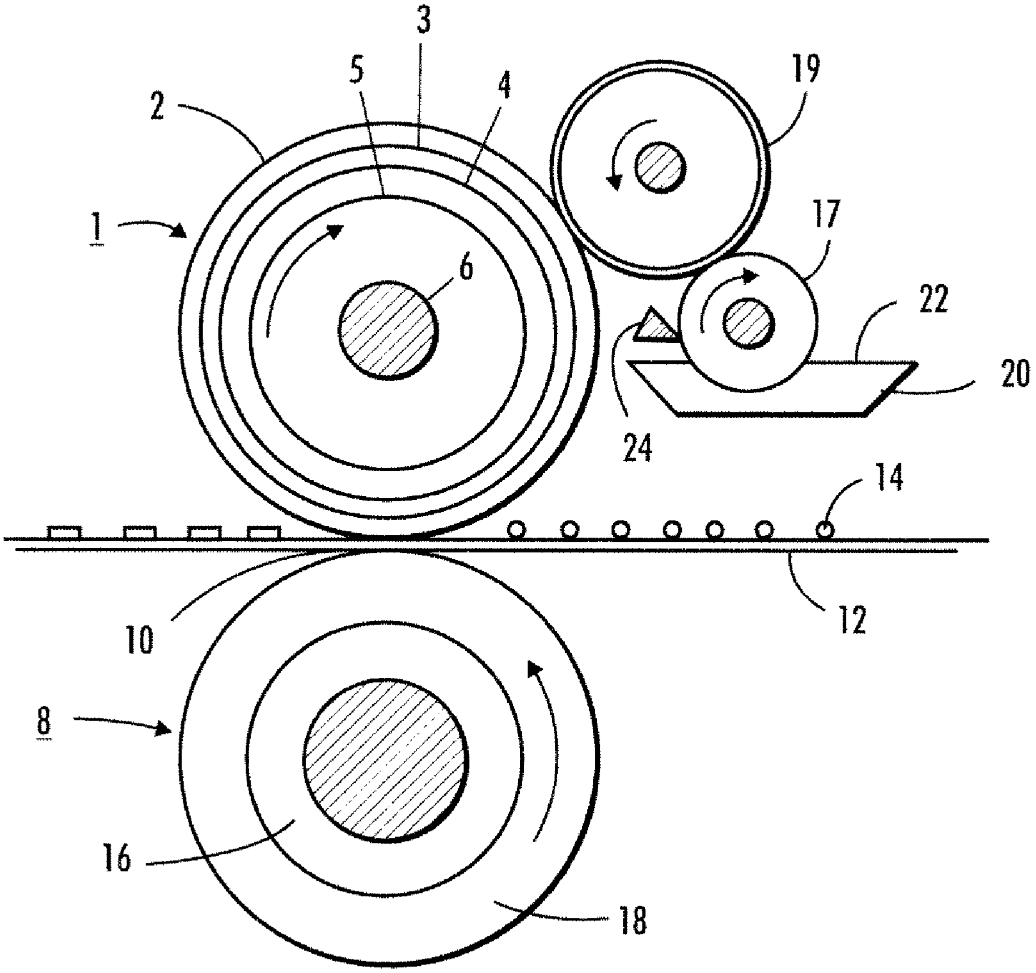
THE FIGURE

FUSER MEMBER WITH INTERMEDIATE ADHESIVE LAYER

BACKGROUND

The present disclosure relates generally to multiple layered toner fusing members and, more particularly, to such members having an adhesive layer between a substrate layer and a surface topcoat layer which prohibits delamination of the separate layers.

Fusing rollers currently used in fusing toners can be of multilayered construction. A two-layer fusing roller frequently comprises a cylindrical base core or base member covered with a silicone elastomer cushion or substrate layer and coated thereon a fluoroelastomer fusing surface or topcoat layer. Fluoroelastomer fusing surface layers have a propensity to interact with toners and cause premature offsets. They are used in conjunction with functional polydimethyl siloxane (PDMS) release oils and are resistant to penetration by the silicone release oils. However, due to poor adhesion of fluoroelastomer layers to silicone elastomers, the inner silicone elastomer surface must be modified before the fluoroelastomer is applied. This modification may include treatment with a primer, addition of an adhesive layer, or surface treatment including corona discharge treatment (CDT), plasma treatment or flame treatment.

U.S. Pat. No. 5,217,837 (Henry et al.) describes fusing rollers having a surface comprising fluoroelastomers such as Viton GF applied as a relatively thin layer overcoated on a relatively thicker layer of a thermally conductive high temperature vulcanized (HTV) silicone elastomer base cushion layer. Such layers are prone to failure by delamination of the fluoroelastomer from the silicone elastomer at an unpredictable period of use or time. To improve the bonding between their HTV silicone elastomer and fluoroelastomer layers and reduce the rate of failure by delamination or debonding, Henry et al. teach the combination of an amino silane primer layer and an adhesive layer. The adhesive layer is prepared by adding vinyl containing silicone coupling agents to a fluoroelastomer solution. The primer layer and the adhesive layer are interposed between a thermally conductive silicone base cushion layer and a fluoroelastomer surface layer.

U.S. Pat. No. 5,534,347 (Chen et al.) describes multilayered fusing rolls provided with an underlying silicone elastomer layer coated with a strongly adhesive fluorocarbon silicone based polymeric composition without prior CDT of the elastomer surface. However, if desired, CDT can still be performed without loss of adhesive strength. In order to achieve the desired adhesive strength, the coating composition contains a hard silicone mixture with fluorocarbon elastomer creating an interpenetrating network of the individually cured polymers.

U.S. Pat. No. 5,332,641 (Finn et al.) describes a fuser member having an amino silane adhesive layer between the surface of the aluminum core base member and the fluoroelastomer fusing surface.

Some current fuser rolls include a topcoat consisting primarily of a fluoroelastomer which is adhered to the LSR substrate via a silane adhesive HV primer 10 by Dow Corning. The current average adhesion achieved with this primer is 2.25 lb/in, with the low end of the distribution reaching approximately 1.7 lb/in. This level of adhesion has been observed to lead to topcoat peeling in internal tests at a premature life with the current material set at a 1.7 lb/in.

There is still a need, however, for coating compositions that provide strong adhesion (i.e. greater than 2.0 lb/in.) of the fluoroelastomer outer fusing surface layer to the silicone elastomer base cushion layer. Such compositions are needed to decrease the rate of fuser member failure due to delamination of the fluoroelastomer outer surface layer from the silicone elastomer base cushion layer.

SUMMARY

In accordance with the disclosure, a fusing member is provided comprising, in order, a base member, a cured liquid silicone rubber substrate layer, an amino silane, and an anhydrous solvent containing adhesive layer. The fusing member further comprises a fluoroelastomer fusing surface topcoat layer including poly(vinylidene fluoride-tetrafluoroethylene-hexafluoropropylene).

In accordance with the disclosure, a method of forming a fusing member is provided comprising a base member and depositing a liquid silicone rubber substrate onto the base member. The method further comprises curing the liquid silicone rubber substrate, diluting a solution of (N-(2-aminoethyl)-3-aminopropyltrimethoxysilane) in anhydrous methanol forming an adhesive, applying the adhesive as a layer onto the substrate, and, topcoating the adhesive layer with a fluoroelastomer layer.

In accordance with still another aspect of the disclosure, a fusing member is provided comprising a base member and a liquid silicone rubber substrate cured about the base member. The fusing member further comprises a solution of (N-(2-aminoethyl)-3-aminopropyltrimethoxysilane) and an anhydrous solvent formed into an adhesive. The adhesive is deposited as a layer onto the substrate and the adhesive layer is topcoated with a fluoroelastomer layer.

BRIEF DESCRIPTION OF THE DRAWINGS

FIG. 1 is a sectional view of a fuser system that may use the fuser member according to the present disclosure.

DETAILED DESCRIPTION

The present disclosure provides an adhesive layer between an underlying cured silicone rubber base cushion layer (i.e. substrate layer) and an elastomer fusing surface (i.e. release layer) comprising poly(vinylidene fluoride-hexafluoropropylene-tetrafluoroethylene).

A fuser member of the present disclosure is described in conjunction with a fuser assembly as shown in FIG. 1 where the numeral 1 designates a fuser roll comprising an elastomer surface or release member 2, an adhesive layer 3, a substrate layer 4, and a suitable base member 5. The base member 5 can be a hollow cylinder or core fabricated from any suitable metal such as aluminum, anodized aluminum, steel, nickel, copper, and the like. The base member 5 can have a suitable heating element 6 disposed in the hollow portion thereof and that is coextensive with the cylinder. Backup or pressure roll 8 cooperates with the fuser roll 1 to form a nip or contact arc 10 through which a copy paper or other substrate 12 passes, such that toner images 14 on the copy paper or other substrate 12 contact the elastomer surface 2 of fuser roll 1. As shown in FIG. 1, the backup roll 8 has a rigid steel core 16 with a soft surface layer 18 thereon, although the assembly is not limited thereto. Sump 20 contains a polymeric release agent 22 which may be a solid or liquid at room temperature, but is a fluid at operating temperatures.

In the embodiment shown in FIG. 1 for applying the polymeric release agent 22 to elastomer surface 2, two release agent delivery rolls 17 and 19 can be rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24, a layer of polymeric release fluid can be applied initially to delivery roll 19 and subsequently to elastomer 2 of the fuser roll 1 in controlled thickness ranging from submicrometer thickness to thickness of several micrometers of release fluid. Thus, by metering device 24 about 0.1 to 2 micrometers or greater thickness of release fluid can be applied to the surface of elastomer 2.

As used herein, the term "fuser" or "fixing" member, and variants thereof, may be a roll, belt such as an endless belt, flat surface such as a sheet or plate, or other suitable shape used in the fixing of thermoplastic toner images to a suitable substrate. It may take the form of a fuser member, a pressure member or a release agent donor member preferably in the form of a cylindrical roll. As will be described in more detail below, there may be one or more intermediate layers between the substrate 4 and the outer layer 2 of the cured elastomer. Typical materials having the appropriate thermal and mechanical properties for such layers include silicone elastomers, fluoroelastomers, EPDM (ethylene propylene hexadiene), and Teflon® (i.e., polytetrafluoroethylene) such as Teflon PFA sleeved rollers.

In embodiments of the present disclosure, the fuser member 1 is comprised of a core or base member 5, such as metals, with a coating, usually continuous, of a thermally conductive and resilient compressible material that preferably has a high thermomechanical strength. Various designs for fusing and fixing members are known in the art and are described in, for example, U.S. Pat. Nos. 4,373,239, 5,501,881, 5,512,409 and 5,729,813, the entire disclosures of which are incorporated herein by reference.

Generally, the cores can include any suitable supporting material, around or on which the subsequent layers are formed. Suitable core materials include, but are not limited to, metals such as aluminum, anodized aluminum, steel, nickel, copper, and the like.

A coating or substrate layer 4, which is preferably of a thermally conductive and resilient compressible material, is then applied to the core members. The coating 4 can be any suitable material including, but not limited to, any suitable thermally conductive fluorocarbon elastomer rubber. Suitable materials include, for example, bisphenol curable polyhexafluoropropylene-tetrafluoroethylene, and vinylidene fluoride polymers. Silicone elastomer can be combined with the fluoroelastomer in the coating compositions. Typically, it is prepared from peroxide curable polyorganosiloxane generally known as high temperature vulcanizates (HTVs), also room temperature vulcanizates (RTVs) and liquid silicon rubbers (LSRs), which are typically polydimethyl siloxanes with pendant vinyl groups including trifluoropropyl, cyanopropyl, phenyl and vinyl are used to substitute for some of the methyl groups in order to impart specific cure, mechanical or chemical properties to silicone rubber.

Introduction of phenyl groups reduces elasticity and increases tensile and tear strength of vulcanizates. Phenyl groups reduce vulcanization yield. Trifluoropropyl groups increase solvent resistance. Introduction of low percentages of vinyl groups reduces vulcanization temperature and imparts greater elasticity and lower compression set to rubbers. Peroxide cure gums may also be vinyldimethylsiloxy terminated. The peroxides most commonly used are benzoyl peroxide and bis(dichlorobenzoyl) peroxide. Dicumyl peroxide can be used for vinyl containing polymers. Generally, peroxide loading is 0.2 to 1.0 percent and cure is at 120° to 140° C. In addition, other peroxides, such as 2,5-dimethyl-2,5-bis(t-butyl peroxy) hexane, can be used to crosslink HTVs at temperatures up to 180° C.

Other fluoroelastomers useful in the practice of the present disclosure include those described in detail in U.S. Pat. No. 4,257,699, the entire disclosure of which is incorporated herein by reference, as well as those described in U.S. Pat. Nos. 5,017,432 and 5,061,965, the entire disclosure of which is incorporated herein by reference. As described therein, these fluoroelastomers, particularly from the class of copolymers and terpolymers of vinylidenefluoride, hexafluoropropylene and tetrafluoroethylene, known commercially under various designations as Viton A, Viton E60C, Viton E430, Viton 910, Viton GH and Viton GF. The Viton designation is a Trademark of E.I. DuPont de Nemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas a poly(propylene-tetrafluoroethylene), Fluorel II (LII900) a poly(propylene-tetrafluoroethylene-vinylidenefluoride) both also available from 3M Company as well as the Tecnoflons identified as FOR-60KIR, FOR-LHF, N. Mex., FOR-THF, FOR-TFS, TH, TN505 available from Montedison Specialty Chemical Co. Typically, these fluoroelastomers are cured with a nucleophilic addition curing system, such as a bisphenol cross-linking agent with an organophosphonium salt accelerator as described in further detail in the above referenced U.S. Pat. Nos. 4,257,699 and 5,017,432. A specific, non-limiting examples of a suitable curing agent is Viton Curative VC50® (available from United Chemical Technologies, Inc.), which includes an accelerator (such as a quaternary phosphonium salt or salts like VC20) and a cross-linking agent (bisphenol AF or VC30). Other curing agents include, for example, but are not limited to, AO700 curative (N-(2-aminoethyl)-3-aminopropyltrimethoxysilane), available from United Chemical Technologies, Inc.).

In one embodiment, the fluoroelastomer can be one having a relatively low quantity of vinylidenefluoride, such as in Viton GF, available from E.I DuPont de Nemours, Inc. The Viton GF has 35 weight percent vinylidenefluoride, 34 weight percent hexafluoropropylene and 29 weight percent tetrafluoroethylene with 2 weight percent cure site monomer.

In addition to the core member 5 and the outer coating or release layer 2, the fuser or other members may also include one or more thermally conductive intermediate layers 3 between the substrate 4 and the outer layer 2 of the cured elastomer. Such intermediate layers 3 can include, for example, a primer layer, an adhesive layer, a metal oxide filler layer, and the like.

Typical materials having the appropriate thermal and mechanical properties for such intermediate layers 3 include thermally conductive (e.g., 0.59 watts/meter/.$^{-\circ}$. Kelvin) silicone elastomers such as high temperature vulcanizable ("HTV") materials, liquid silicone rubbers ("LSR") and room temperature vulcanizable ("RTV"), which may optionally include filler materials such as an alumina filler. The silicone elastomer may have a thickness of about 2 to 10 mm (radius). An HTV is either a plain polydimethyl siloxane ("PDMS"), with only methyl substituents on the chain, $(OSi(CH_3)_2)$ or a similar material with some vinyl groups on the chain (OSi $(CH.dbd.CH_2)$ $(CH_3)$). Either material is peroxide cured to create crosslinking. An LSR usually consists of two types of PDMS chains, one with some vinyl substituents and the other with some hydride substituents. They are kept separate until they are mixed just prior to molding. A catalyst in one of the components leads to the addition of the hydride group (OSiH ($CH_3$)) in one type of chain to the vinyl group in the other type of chain causing crosslinking.

To promote adhesion between the fuser member core 5 and the hydrofluoroelastomer surface layer 2, an adhesive, and in particular a silane adhesive, such as described in U.S. Pat. No. 5,049,444, the entire disclosure of which is incorporated herein by reference, which includes a copolymer of vinylidenefluoride, hexafluoropropylene and at least 20 percent by weight of a coupling agent that comprises at least one organo functional silane and an activator, may be used. In addition, for the higher molecular weight hydrofluoroelastomers such as, for example, Viton GF, the adhesive may be formed from the FKM hydrofluoroelastomer in a solvent solution together with an amino silane represented by the formula as described in U.S. Pat. No. 5,332,641, the entire disclosure of which is incorporated herein by reference.

The adhesive and surface layers can be applied to the core member 5 by any suitable method known in the art. Such methods include, but are not limited to, spraying, dipping, flow coating, casting or molding. Typically the surface layer 2 of the fuser member is from about 4 to about 9 mils and preferably 6 mils in thickness, as a balance between conformability and cost and to provide thickness manufacturing latitude.

In one exemplary embodiment, a fuser member of the present disclosure can be described as a multilayer fuser roll comprising, in sequential order, a base support member 5, a relatively thick addition cured silicone elastomer layer or liquid silicone rubber layer (LSR) 4, a strongly adhesive vinyl- and hydride-containing silane primary or adhesive layer 3, a fluoroelastomer surface layer 2 which may also contain a thermally conductive material such as metal oxides (e.g. $Al_2$ $O_3$, CuO or SnO2). The adhesion layer can be between 2.5 and 25 microns thick. The base support member 5, which is typically a hollow Al or steel cylinder core, can be coated with a conventional silicone primary agent (DC-1200). The primed core can be dried and injection molded or broad coated with a layer of addition cured poly(dimethyl siloxane) (PDMS) silicone elastomer. One commercially available material for forming the highly cross-linked base cushion layer is Silastic J® or Silastic E® silicone rubber available from Dow Corning Corp.

According to the present disclosure, the adhesive layer 3 which will bond the base cushion silicone elastomer layer 4 and fluoroelastomer surface fusing layer 2 can be represented by the embodiments hereinafter.

One exemplary embodiment for the adhesive layer 3 material comprises a solution of AO700 in anhydrous methanol. A design of experiment (DOE) was formulated and conducted to identify parameters for the use of a methanol diluted AO700 as an adhesive. The factors that were studied included exemplary ranges as follows:

| FACTORS | From about | To about |
|---|---|---|
| Dilution levels | 5% | 10% |
| Adhesive amounts | 2.84 g/1440 $cm^2$ | 3.74 g/1440 $cm^2$ |
| Adhesive dwell times | 15 min | 180 min |

Fuser rolls based on the above DOE were flowcoated with a topcoat formulation consisting primarily of a fluoroelastomer. Based on this DOE, a 5%-10% dilution of AO700 with methanol (95 g of AO700 with 5 g of Anhydrous methanol to 90 g of AO700 with 10 g of Anhydrous methanol), 2.84-3.74 g/1440 $cm^2$ of adhesive on the roll (per 1440 $cm^2$), and a 15-180 minute dwell time was tested for one exemplary adhesive layer. The dwell time represents the period of time that the adhesive layer 3 is held under ambient conditions before applying the release layer 2.

Adhesion of the topcoat 2 to an LSR substrate 4 was measured via a pull test method. The following parameters of 5% dilution of AO700 with methanol, 3.74 g/1440 $cm^2$ of adhesive and a 15 min. dwell time produced a 3.37 lb/in pull force. This pull force is far above the specification of 1.5 lb/in minimum and significantly higher than that currently achieved in production with HV Primer 10 (i.e. an average of 2.25 lb/in.).

As described above, using AO700, diluted with methanol as an adhesive layer 3 to bond the fluoroelastomer topcoat 2 to the LSR fuser roll substrate 4 provides for improved adhesion. The improved adhesion can be achieved at dilution levels of methanol from about 1% to about 30%.

The outermost surface layer of the multilayer fuser member of this disclosure can comprise a cured fluoroelastomer, for example a terpolymer of vinylidene fluoride ($VF_2$), tetrafluoroethoxy (TFE), and hexafluoropropylene (HEP).

The adhesive layer of this disclosure adheres strongly, without delamination, to an underlying silicone elastomer layer and the outermost fluoroelastomer surface layer. Peel strength tests were performed on several of the fusing rolls to verify the improvement in adhesion to the underlying layer.

While the disclosure has been described in conjunction with the specific embodiments described above, it is evident that many alternatives, modifications and variations are apparent to those skilled in the art. In particular, although the above discussion of the disclosure is with respect to fuser rolls or fixing members for electrostatographic printing processes, the disclosure can be applied to any type of member having an elastomer coating over a supporting substrate. Accordingly, the preferred embodiments of the disclosure as set forth above are intended to be illustrative and not limiting. Various changes can be made without departing from the spirit and scope of the disclosure.

The invention claimed is:

1. A fusing member comprising, in order:

a base member;

a cured liquid silicone rubber substrate layer;

an amino silane and an anhydrous solvent containing adhesive layer;

a fluoroelastomer fusing surface topcoat layer comprising poly(vinylidene fluoride-tetrafluoroethylene-hexafluoropropylene);

wherein said solvent is selected from the group consisting of a methanol and a ketone;

said solvent content of said adhesive layer is from about 5% to about 10%;

said amino silane is comprised of curative (N-(2-aminoethyl)-3-aminopropyltrimethoxysilane); and, wherein an adhesion between said topcoat layer and said substrate layer includes a pull force in a range exceeding 2.25 lb/in and up to 3.37 lb/in.

2. A fusing member comprising:

a base member;

a liquid silicone rubber substrate cured about said base member;

a solution of (N-(2-aminoethyl)-3-aminopropyltrimethoxysilane) and an anhydrous solvent formed into an adhesive;

said adhesive deposited as a layer onto said substrate;

said adhesive layer topcoated with a fluoroelastomer layer;

said anhydrous solvent content of said adhesive layer is from about 5% to about 10%;

wherein a weight of said adhesive layer is from about 2.5 g/1440 $cm^2$ to about 4.0 g/1440 $cm^2$;

said anhydrous solvent is selected from the group consisting of a methanol and a ketone; and, wherein an adhesion between said fluoroelastomer layer and the cured said substrate includes a pull force in a range exceeding 2.25 lb/in and up to 3.37 lb/in.

3. A fusing member comprising:

a base member;

a liquid silicone rubber substrate deposited onto said base member;

said liquid silicone rubber substrate cured;

a diluted solution of (N-(2-aminoethyl)-3-aminopropyltrimethoxysilane) in anhydrous methanol forming an adhesive;

said adhesive applied as a layer onto said substrate;

said adhesive layer topcoated with a fluoroelastomer layer;

wherein said anhydrous methanol content of said adhesive layer is from about 1% to about 30%;

wherein a weight of said adhesive layer is from about 2.5 g/1440 $cm^2$ to about 4.0 g/1440 $cm^2$ ;

wherein applying said adhesive includes a dwell time from about 15 min. to about 180 min.; and, wherein an adhesion between said fluoroelastomer layer and the cured said substrate includes a pull force in a range exceeding 2.25 lb/in and up to 3.37 lb/in.

4. The fusing member of claim 3, wherein said methanol content of said adhesive layer is from about 5% to about 10%.

* * * * *